(12) United States Patent  (10) Patent No.: US 7,799,405 B1
Vance et al.  (45) Date of Patent: Sep. 21, 2010

(54) THREE DIMENSIONAL REINFORCED CMC ARTICLES BY INTERLOCKING TWO DIMENSIONAL STRUCTURES

(75) Inventors: Steve James Vance, Oviedo, FL (US); Gary B. Merrill, Orlando, FL (US); Alfred Paul Matheny, Jupiter, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 730 days.

(21) Appl. No.: 11/607,345

(22) Filed: Dec. 1, 2006

(51) Int. Cl.
 *B32B 3/24* (2006.01)
 *C03B 29/00* (2006.01)

(52) U.S. Cl. ............... 428/133; 428/132; 428/139; 156/89.11

(58) Field of Classification Search ........... 428/132, 428/133, 139; 156/89.11
See application file for complete search history.

(56) References Cited

U.S. PATENT DOCUMENTS

| | | | |
|---|---|---|---|
| 4,051,290 A | 9/1977 | Jutte et al. | |
| 4,521,496 A | 6/1985 | Sara | |
| 4,578,303 A | 3/1986 | Kundinger et al. | |
| 4,613,473 A | 9/1986 | Layden et al. | |
| 5,506,018 A | 4/1996 | Jacob et al. | |
| 5,506,058 A | 4/1996 | Ikuina et al. | |
| 5,681,639 A | 10/1997 | Minagawa et al. | |
| 5,711,833 A | 1/1998 | Apte et al. | |
| 6,042,315 A | 3/2000 | Miller et al. | |
| 6,119,328 A | 9/2000 | Swars et al. | |
| 6,235,370 B1 | 5/2001 | Merrill et al. | |
| 6,558,785 B1 | 5/2003 | Rawal et al. | |
| 6,617,013 B2 | 9/2003 | Morrison et al. | |
| 6,666,310 B1 | 12/2003 | Berreth et al. | |
| 6,670,021 B2 * | 12/2003 | Schroder et al. | 428/131 |
| 6,758,926 B2 | 7/2004 | Harada et al. | |
| 6,932,566 B2 | 8/2005 | Suzumura et al. | |
| 7,387,758 B2 * | 6/2008 | Merrill et al. | 264/257 |
| 2005/0008824 A1 | 1/2005 | Kawakami et al. | |
| 2005/0022921 A1 | 2/2005 | Morrison et al. | |
| 2005/0158573 A1 | 7/2005 | Elzey et al. | |

* cited by examiner

*Primary Examiner*—William P Watkins, III

(57) ABSTRACT

The interlocking of two or more sections via the insertion of one or more out-of-plane features in one section or combination of sections through a void in one or more a complementary sections can result in a reinforced ceramic matrix composite article upon securing of the sections. The sections can be secured by friction between two tightly matched sections or by the use of a pin, hook, or clamp. The sections can be constructed from one or more CMC laminate sheets. The out-of-plane feature can be a loop or a flange and the void can be an orifice or a matched loop in the complementary sheet. The securing of the sections can result in a CMC article where the delamination between sheets is inhibited.

16 Claims, 9 Drawing Sheets

(a)  (b)

THREE DIMENSIONAL REINFORCED CMC ARTICLES BY INTERLOCKING TWO DIMENSIONAL STRUCTURES

FIELD OF THE INVENTION

The present invention relates to reinforcement of laminated ceramic matrix composite materials by interlocking out-of-plane features of combined sections.

BACKGROUND OF THE INVENTION

Ceramic matrix composites (CMC) have demonstrated utility as parts for turbines and other high temperature applications. CMC structures are most commonly constructed in the form of a two-dimensional (2D) laminate. A 2D laminate is constructed where two or more sheets of impregnated fibers, typically in the form of a woven cloth, are pressed together and heated to cure the matrix in and between the sheets. The life-limiting failure of such a structure is often due to delamination during repetitive thermal and mechanical cycling of the part due to shear failure in the matrix between fiber sheets. There is no cross-ply reinforcement in the 2D fiber architecture. Presently, most matrix materials delaminate under stress.

The mechanical reinforcement of a 2D laminate has been accomplished by the use of metallic fasteners placed through the sheets for the reinforcement of the laminate. Special bushings have been shown to compensate for the mismatch of thermal expansion characteristics of the ceramic and the metal placed through the sheets for the reinforcement. However, this approach is not always desirable. For many applications, the temperatures to which the metals are exposed are very high or the presence of the metal on both faces of the laminate is contradictory to the requirements for the article made from the composite. Nevertheless, in the absence of a matrix material of sufficient resistance to shear, mechanical reinforcement provides an attractive solution. A reinforcement that does not use a metal, or does not use a metal at a heat exposed surface, is desirable.

A ceramic matrix composite fastener has been disclosed in U.S. Pat. No. 6,042,315. The structure has a head and a shank such that the shank can be passed through a slot in a laminate panel. The head and slot are cut to have matching surfaces such that the panel can be attached to a housing. The fastener is constructed by a lay-up of fabric or tape where the fibers or tow are oriented at −45, 0, 45 and 90 degrees to yield a quasi-isotropic laminate. In this manner the stress on the head is partially carried by some fibers essentially aligned with the stress. Unfortunately, this is not necessarily the case with the panel where the stress is applied by the fastener perpendicular to the orientation of the fibers, resulting in the potential to promote the delamination of the panel.

SUMMARY OF THE INVENTION

A reinforced CMC article is constructed of two or more sections where each section is composed or one or more laminate sheets. One or more sections have one or more out-of-plane features that extends through one or more topography matched macroscopic voids in one or more complementary sections. The interface of the complementary sections make continuous intimate contact. The out-of-plane portion can be a loop and the void can be an orifice. Alternately the void can be a matching loop. The out-of-plane portion can be a flange and the void can be a slot. Additionally, one or more means to secure the complementary sections via the out-of-plane portion can be provided. The means to secure the sections can be a pin, hook, clamp or other suitable structure which can be inserted through one or more loops.

The CMC article can have a flange, as the out-of-plane portion and the void can be a tightly fitting slot where friction between the slot and the flange placed through it secures the complementary sections. The flanges can contain a hole through which a pin, a hook, a clamp, or other suitable structure can be inserted through the hole. The flange can have one or more grooves where the complementary section can be secured by translating the slot into the groove in the flange. The grooves can be on both sides of the flange and the slot can be divided between two split portions of the complementary section, such that the sections can be secured by translating the two parts of the slot into the two grooves of the flange.

A reinforced CMC article can comprise two or more sections defined by a continuous interface with matching topography where one or more portions of an edge of one section extend beyond the interface between the sections and one or more complementary portions of an edge of a complementary section extends beyond the interface between the sections. The complementary portions of the edges form a channel where a locking member can reside in the channel to secure the sections. The locking member can be a rod or rope.

DETAILED DESCRIPTION OF THE INVENTION

The reinforcement of a CMC structure is accomplished according to the insertion of an out-of-plane feature of one section, which comprises a single fabric sheet or an ensemble of sheets, that is topographically matched to a void to receive the out-of-plane feature in a complementary section. The complementary section independently comprises a single fabric sheet or an ensemble of sheets. The out-of-plane feature is secured after its insertion through the void by friction or by mechanically interlocking or by using a means to lock the layers that forces intimate contact of the sections at the interface between the sections. The means can impose a compressive force on the interface between the sections. In this manner, the delamination of the sections in the vicinity of the out-of-plane feature is inhibited. The inhibition of delamination in the vicinity of the out-of-plane interlocking features can inhibit delamination throughout the structure or can halt the propagation of a shear defect generated elsewhere in the structure. The resulting reduction of the propensity to delaminate between sheets of the CMC can extend the life cycle of the CMC article. The invention permits the construction of thinner walled CMC parts, resulting in a reduction of the thermal stresses imposed on the article and a higher surface to volume ratio, which alleviates some of the cooling requirements. The material costs also decline proportionally with the thickness of the composite. As follows, the invention is described in terms of two complementary sections. It is to be understood that the sections can independently comprise a single sheet or an ensemble of sheets.

Figure 1:
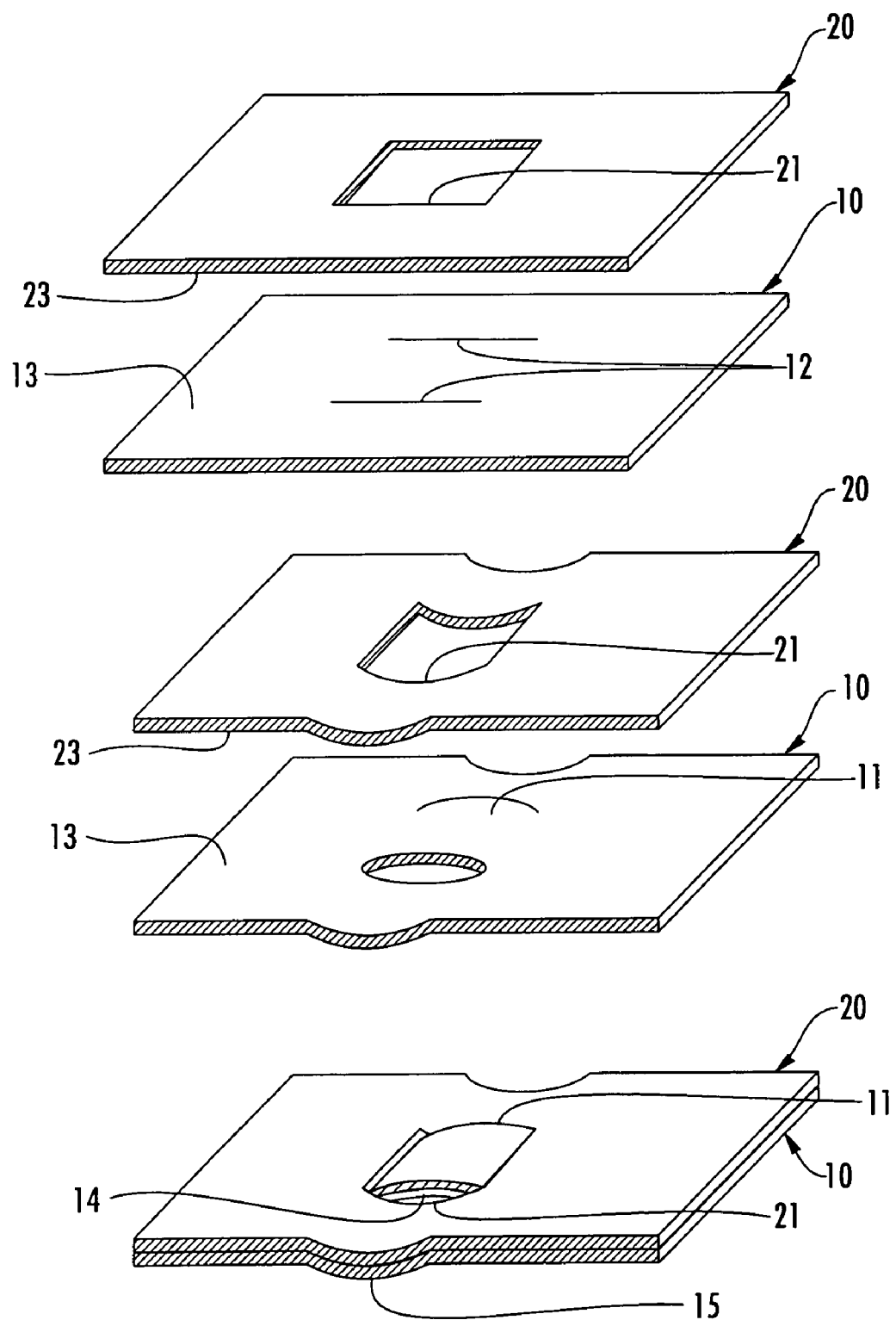
FIG. 1 is an exploded perspective of a CMC article where a loop in one section is inserted into an orifice of a complementary section.

As shown in FIG. 1, the out-of-plane feature can be a loop 11 in one section 10 which is fitted through an orifice 21 of the appropriate shape and size in a complementary section 20 to permit the intimate contact of the two inner faces 13 and 23 of the two sections 10 and 20. The composite can be held tightly together by snugly fitting a pin or other suitable structure into hole 14 where the loop 11 extends through the orifice 21. The pin can be constructed of a metal or alloy. If needed for use in a very high temperature application, the pin can be a ceramic or ceramic composite. Other materials are acceptable if permitted by the thermal environment and the tolerance of the pin and CMC materials to any thermal expansion differences.

The loop 11 may be formed by making two cuts 12 of a relatively short length on a section 10, as shown in FIG. 1. It is preferable that the cuts 12 be between individual fibers or tows of the fabric where the cuts 12 are formed parallel to one set of tows in the woven pattern such that the loop 11 includes a plurality of tows which are parallel to the cuts and continuous over the entire loop 11. No other fabrication is necessary to prepare the section if the article prepared from the composite can be used with a small protrusion 15 from the surface opposite the surface where the loops 11 reside upon fabrication, which results from the insertion of the pins or other means of securing the sheets. The protrusion 15 can be minimized in size by using a flat pin.

Figure 2:
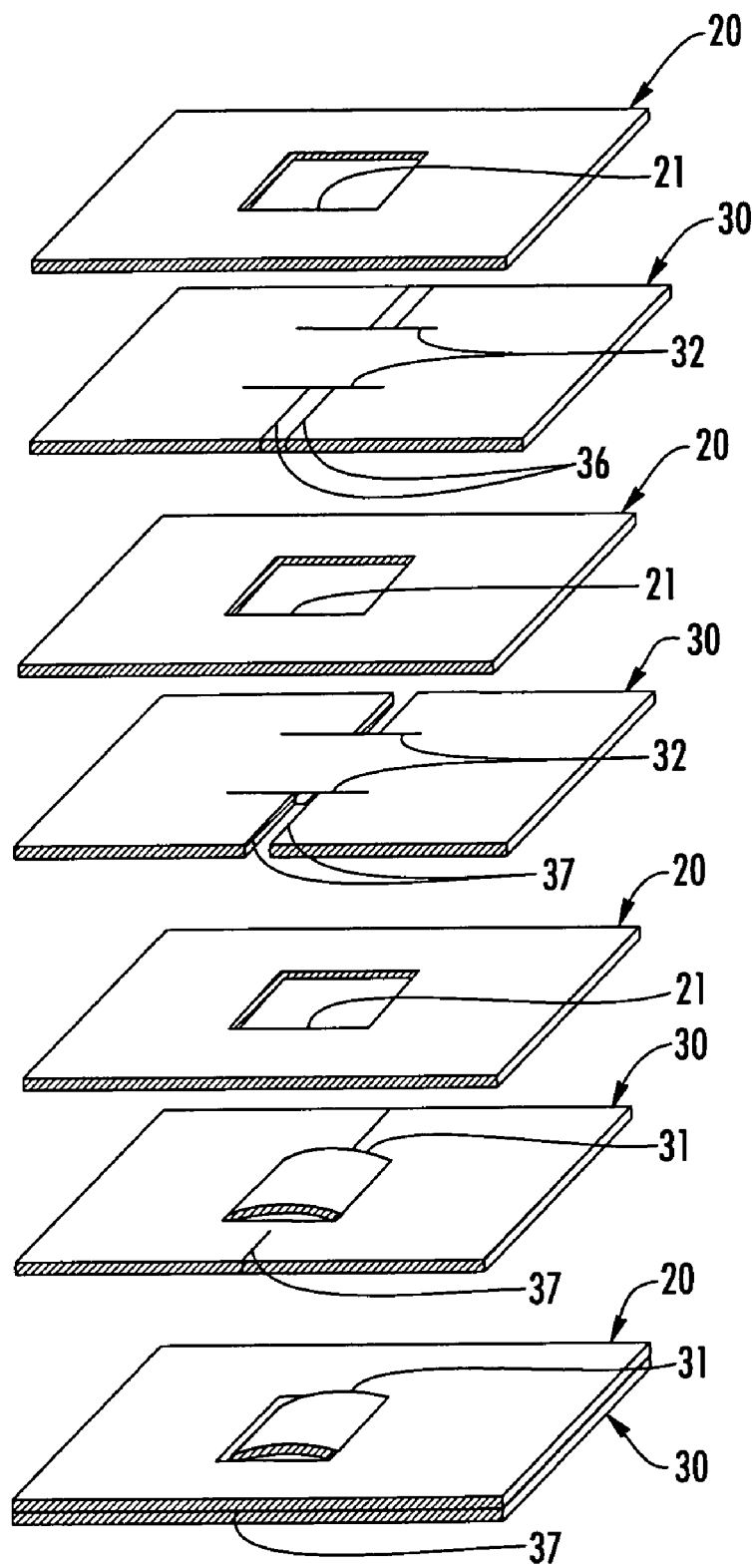
FIG. 2 is an exploded perspective of a CMC article where a loop resulting by removal of portions of a sheet or an ensemble of sheets of one section is inserted into an orifice in a complementary section.

If the ultimate use of the composite article requires that one surface has no protrusions from the primary plane of the composite, as shown in FIG. 2, cuts 36 on the section can be made perpendicular to two cuts 32 and the fabric between the cuts 36 can be removed. In this manner the area between the first two cuts 32 can be displaced out-of-plane to form the out-of-plane loop 31 bringing the edges 37 remaining after the removal of fabric into contact, as shown in FIG. 2.

Alternately, particularly when the section is a single sheet, the fabric can be woven to form one or more loops 41 on a section 40 as shown in FIG. 3(a). The loops formed in the manner illustrated in FIGS. 1, 2 and 3(a) leave an open space on the face to be exposed to the hot environment. This may be inappropriate for some applications and may necessitate the use of a ceramic pin. As shown in FIG. 3(b), weaving techniques can be applied that permit the first section 40 to display loops 41 with a continuous fabric 48 underneath the loop 41 where some of the tows are used to form the out-of-plane loop while other tows are woven in the continuous plane of the fabric. This approach is particularly practical where the section 40 is a single sheet of fabric.

Figure 3:
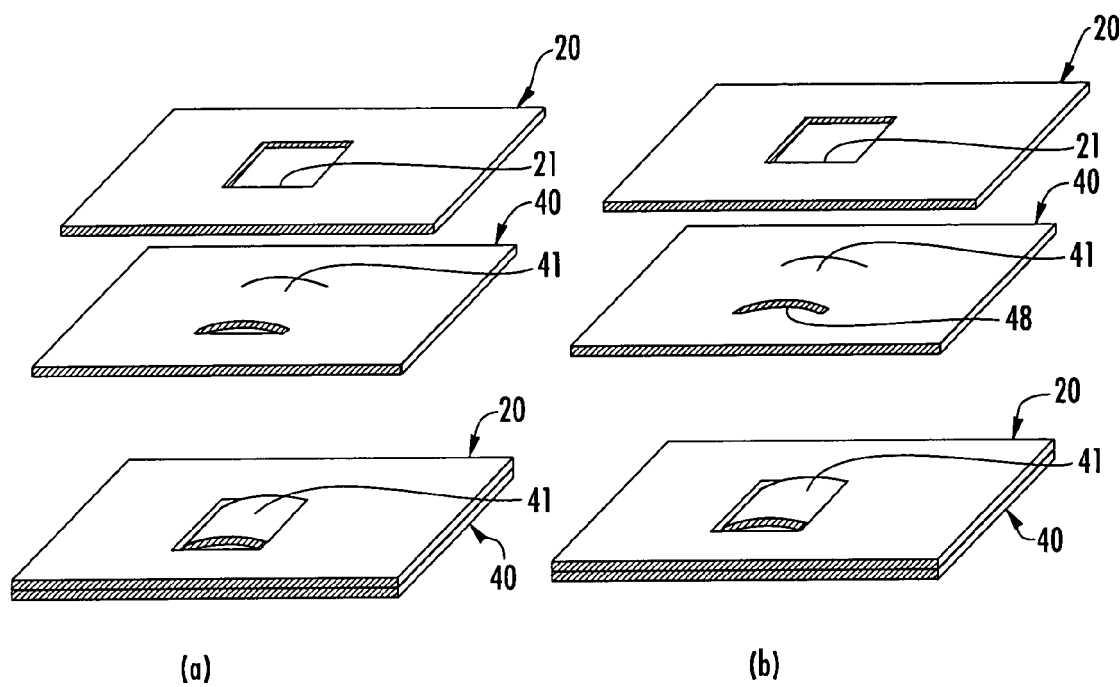
FIG. 3 is an exploded perspective of a CMC article where a loop results from the weaving of a section where: (a) no fabric is present below the loop; and (b) where the weave has resulted in a loop with fabric below the loop.

As illustrated in FIGS. 1, 2 and 3, the orifice 21 can be cut from the complementary section 20 with the width of the orifice 21 equal to or slightly greater than the width of the loop and long enough to permit the entire loop to extend through the orifice 21 and force the inner faces of the sections tightly together when the pin is inserted into the loop. The pin must be longer than the width of the orifice that accepts the loop. The pin may be of a length such that it is inserted into one loop or a series of loops depending upon the size of the structure and the application for which the structure is to be used. One end of the pin may be deflected at an angle, for example an L shaped pin with a deflection of 90°, which can prevent the pin from slipping out of the loop during subsequent use of the part if the friction imposed on the pin is insufficient to assure that the pin remains where placed. The sections can be secured by locking with a hook rather than a pin. The hook or pin can be used to secure the article to an additional structure. Generally, although not necessarily, it is intended that the pin or hook are on the face of the composite that will be exposed to lower temperatures during its ultimate use.

The construction of the 3D article can be carried out before curing and the entire pre-impregnated composite article can be cured in a single step. Alternately one section, either that with the loop or the orifice, can be cured or partially cured prior to the construction of the 3D structure followed by a second curing step after assembly. Alternately, the two sections can be individually cured or partially cured and then the 3D structure assembled and subsequently cured a second time with or without additional matrix material. Optionally, additional fabric can be used to enhance the properties of the structure.

Figure 4:
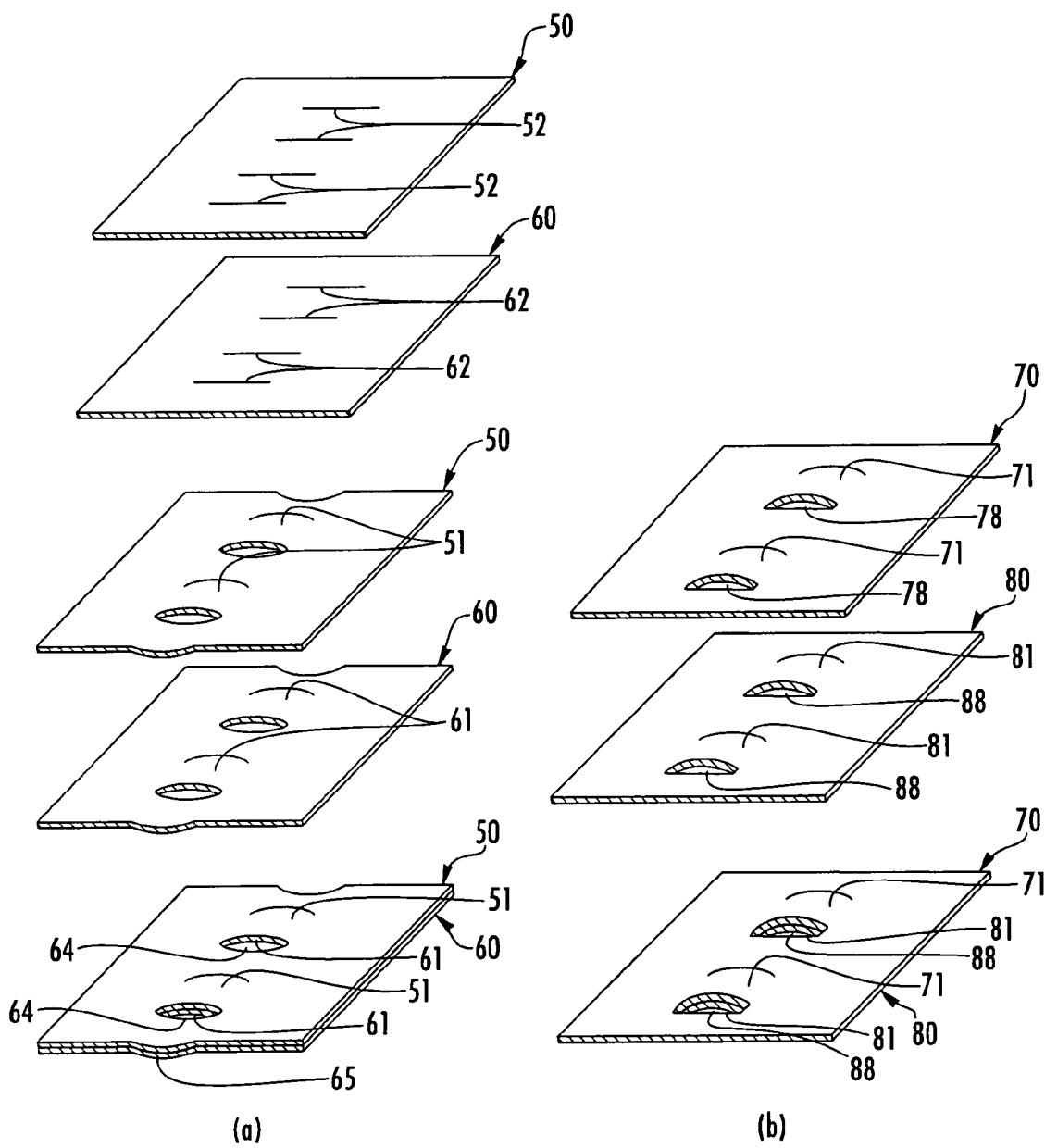
FIG. 4 is an exploded perspective of a portion of a CMC article where: (a) a section with cut loops are inserted into complementary loops in a complementary section with matching loops, and (b) a section with a woven loop with fabric below the loop is inserted into a complementary woven loop where no fabric is present below the loop in a complementary section.

An alternative to the orifice on the complementary section 50 is a matching loop 51 as illustrated in FIG. 4(a). In this manner cuts 52 and 62 are made to both sheets 50 and 60 such that the loops 61 of one section 60 fit into the loops 51 of the complementary section 50, which can allow a pin or other means of mechanically securing the sections to be inserted through the hole 64 defined by the combined loops 51 and 61. A protrusion 65 on the surface that will be exposed to high temperatures is needed to allow the insertion of a pin or other means to secure the sections. If a smooth surface is required for a face of the article, it is preferable if the loops 71 and 81 are prepared during the weaving process, as illustrated in FIG. 4(b), rather than by the formation of loops via cuts. FIG. 4(b) shows a section 80 where the weave is continuous 88 under the loop 81. The complementary section 70 is constructed such that an open area 78 permits the insertion of the loop 81 into the complementary loop 71. Loops which are formed by removing fabric and bringing edges into contact, as in FIG. 2, have a slit through both sections and under some conditions of use can potentially promote failure at the slit. This potential slit induced failure can be addressed by having a continuous woven fabric under the loop 81.

Figure 5:
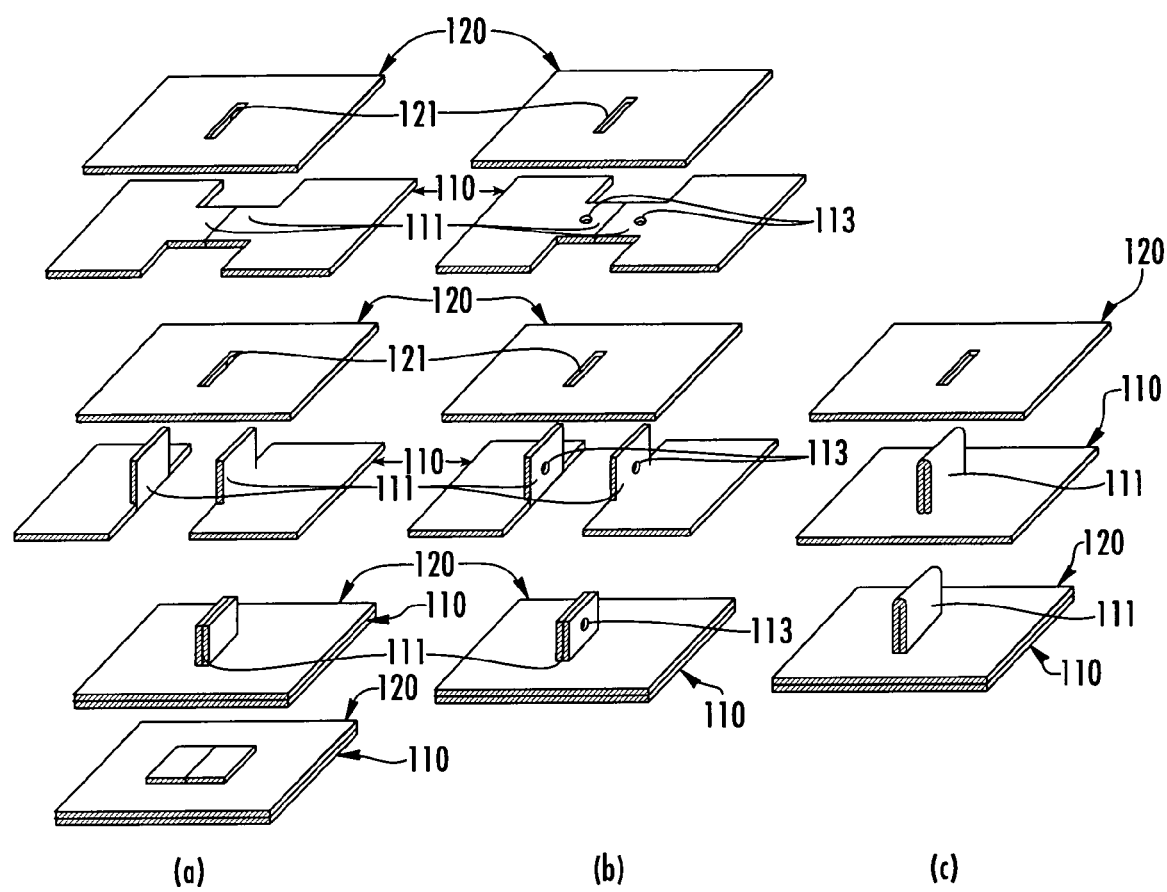
FIG. 5 is an exploded perspective of a CMC article where a flange of one section is inserted into a slot in a complementary section where: (a) the flange is secured by friction between the flange and slot; (b) the flange contains a hole to be alternately or additionally secured by a pin or hook; and (c) where the flange is formed by the weaving of the fabric and secured by friction between the flange and the slot.

Another type of out-of-plane feature that can be used is to have a flange in one section that can be fitted through a slot in the complementary section. As shown in FIG. 5 the section 110 with the flange 111 can be cut from a fabric sheet such that the flange portion can be deflected 90° and fit through a slot 121 in the complementary section 120. As shown in FIG. 5(a), the width of the slot 121 in the complementary section 120 can be sufficiently narrow such that forcing the flanges 111 through the slot 121 locks the flanges 111 together and secures the interface between the two sections 110 and 120. In this manner the matched fit of the flanges 111 and slot 121 is the means to lock the sections together with intimate contact of the inner surfaces. Particularly when the flanges are fed through the slots prior to curing, the flanges 111 can be pressed against the complementary slot section 120 and cured to further lock the sections together and reduce the thickness of the CMC article. Alternately or additionally, as in FIG. 5(b), the flanges 111 can have a hole 113 in them where a pin or hook can be inserted locking the sections in intimate contact. As described previously, alternately or additionally, the pin or hook can be used to mount the CMC article to a substructure of the ultimate device. The section containing the flange 111 may also be woven in this form where the first section 110 is composed of a single sheet as shown in FIG. 5(c).

FIG. 6(a) illustrates an embodiment where a flange section 130 is matched to a complementary split slotted section 140. The flange section 130 includes a groove 134 at the base of the flange 131 where the width of the groove 134 is equal to the thickness of the complementary section. The complementary split section 140 requires the combined slots 141 to be approximately equal in length to the length of the flange 131 minus the length of the grooves 134 in the flange. The means to lock the sections is the insertion of the slots 141 on the complementary section 140 into the grooves 134 in the flanges 131. The flanges 131 can be pressed against the complementary split section 140 if constructed before curing to further lock the sections or reduce the thickness of the article.

FIG. 6(b) illustrates a variation on the use of a flange section 130 with a groove 134 where the groove 134 is formed on only one side of the flange 131. The complementary slotted section 140 can be constructed as a single piece where the slot 141 is the full length of the flange 131. Locking of the sections 130 and 140 occurs when the flange 131 is placed through the slot 141 and the flange section 130 is displaced such that the groove 134 slides over the complementary section and the portion of the flange 131 above the groove 134 is also in intimate contact with the slotted section 140. In this variation a portion of the slot 141 is not filled with the flange 131 when assembled.

Figure 7:
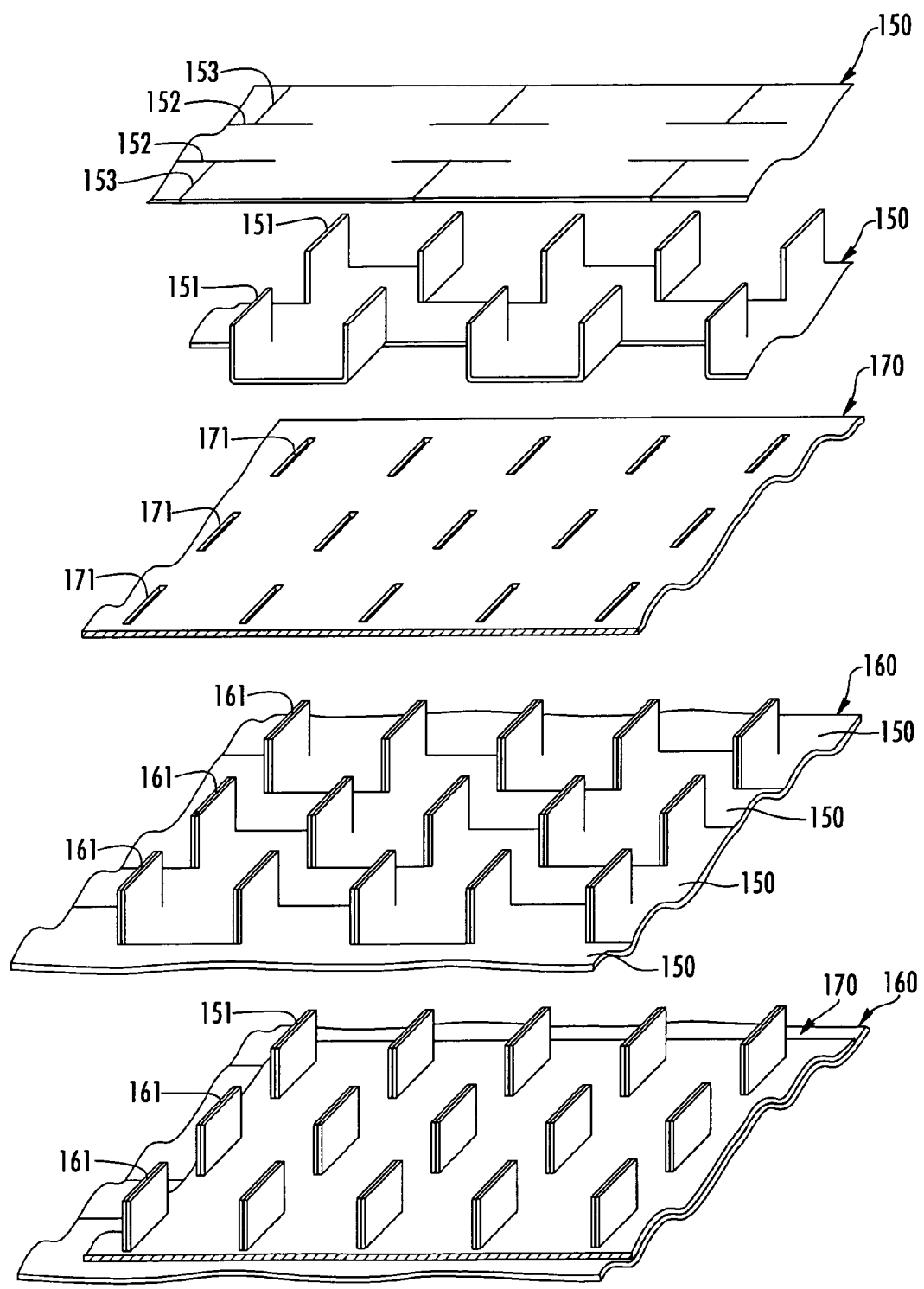
FIG. 7 is an exploded perspective of a portion of a CMC article where a combined flange section can be assembled from two or more flange sections and secured by friction of the flanges with a single complementary slotted section.
Figure 8:
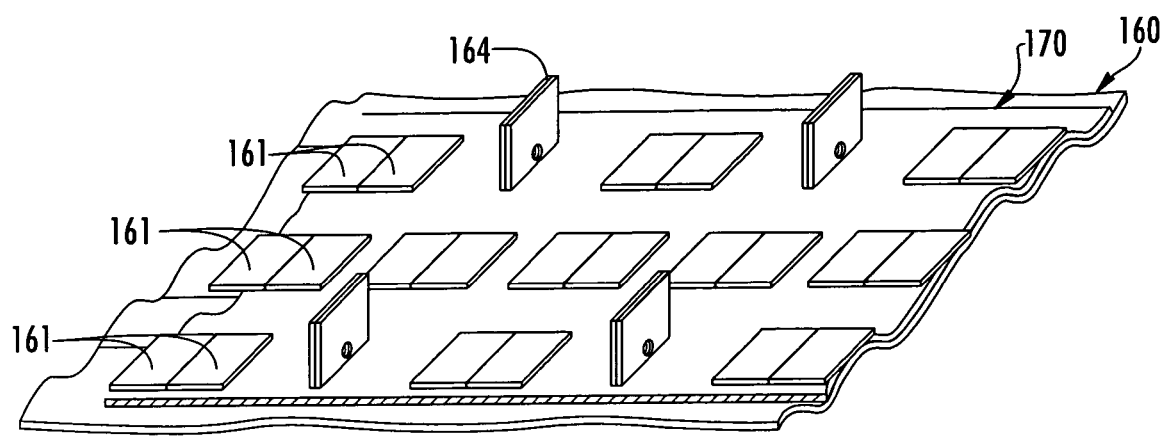
FIG. 8 is a perspective view of a CMC article where friction secures some flanges and other flanges have holes to provide additional or alternate means of securing or for mounting of the combined article to a structure.

The out-of-plane flanges of one section of the type shown in FIG. 5 can be formed along the edge of a single or stack of fabric sheets such that little of the sheet is discarded during the manufacture of a CMC article and multiple sites of 3D reinforcement are formed along each edge. As shown in FIG. 7 sections 150 can be constructed from a single sheet or stack of fabric sheets where perpendicular cuts 152 and 153 define flanges 151 when folded out-of-plane. Two or more of these sections 150 can be fit together to form a combined section 160 with combined flanges 161. A complementary section 170, with slots 171 cut in the appropriate place to accept the combined flanges 161 forms an article, can then lock this combined section 160. Although FIG. 7 displays a section held together by a tight fit of the combined flanges 161 and slots 171 in the manner illustrated in FIG. 5(a), holes can be drilled in the combined flanges 161 to accept a pin to lock the sections together as in FIG. 5(b). FIG. 8 shows a structure such as that of FIG. 7 where the majority of combined flanges 161 have been pressed against the slot sheet 170 with the exception of four flanges where holes 164 have been drilled such that a pin can be inserted to anchor the CMC article to a substrate.

Figure 9:
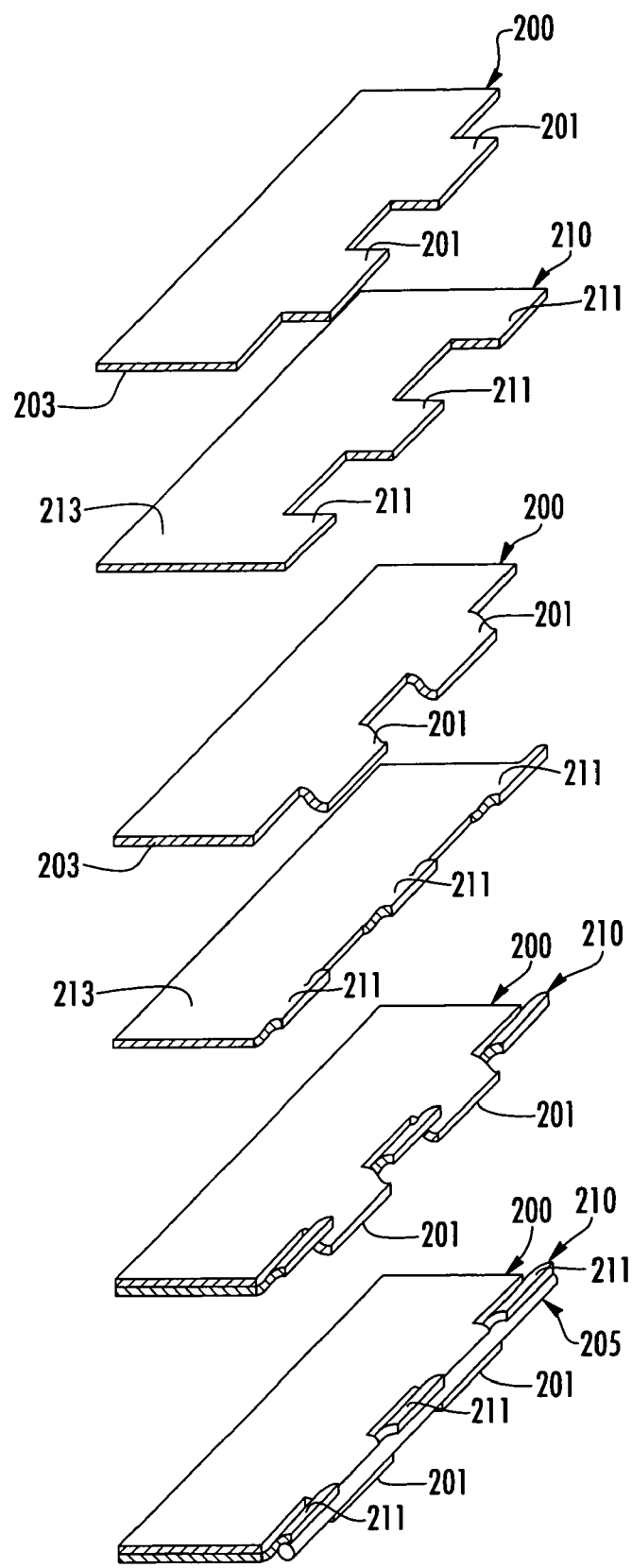
FIG. 9 is an exploded perspective a portion of a CMC article where an edge reinforcement results when a channel is formed from the deflection of edge segments out-of-plane and locked with a rod.

The out-of-plane features can be a portion of the edge of a section as illustrated in FIG. 9. The complementary sections 200 and 210 have the out-of-plane features 201 and 211 extending beyond the edges. The complementary sections begin a continuous interface when inner faces 203 and 213 are pressed together. The features are deflected across the interface such that the out-of-plane features 201 or 211 of each section 200 or 210 cross the interface where a complementary section 210 or 200 has a complementary void. The complementary out-of-plane features 201 and 211 combine to define a channel to accept a locking member 205. The locking member 205 can be a rod or a braided rope, which is inserted into the channel forcing the interface of the two sections 200 and 210 to be intimately contacted and secured.

Figure 6:
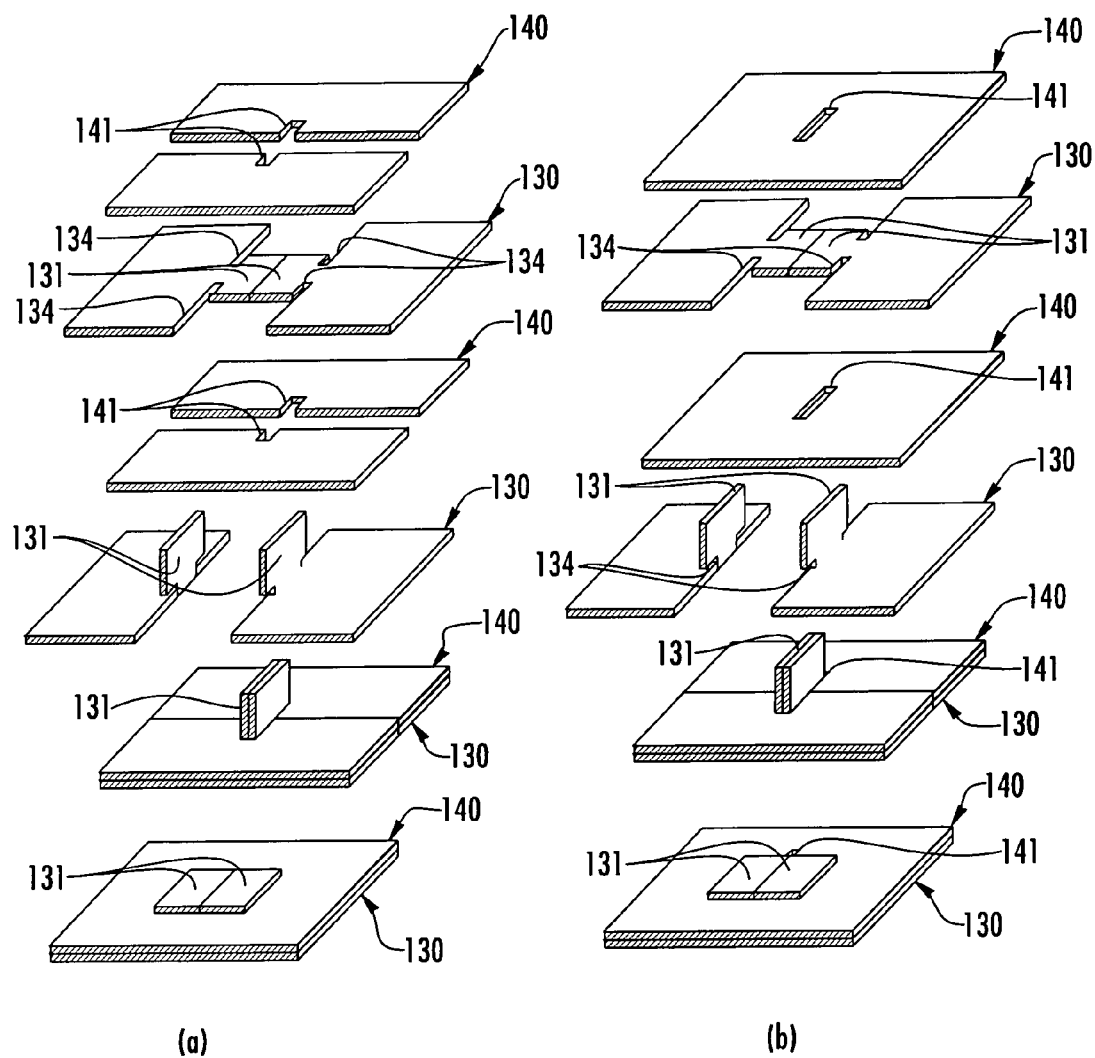
FIG. 6 is an exploded perspective of a portion of a CMC article using a grooved flange where: (a) the slot is formed by a combination of two portions and placed in two grooves on the flange to secure the flange; and (b) the flange has a single groove, which can be fitted into the slot and translated in the slot to secure the flange.

Reinforcement of the edge can be constructed from a flange inserted into a slot in the manner illustrated in FIG. 5 or FIG. 6. The flange and slot are near the edge of their respective sections, and the out of plane deflection is provided at only one face of the CMC article rather than at both faces of the CMC article.

These and other embodiments are possible and it should be understood that the invention is not limited to the particular embodiments illustrated and described. Variations and modifications can be made without departing from spirit and scope of the novel concept as defined in the claims.

We claim:

1. A reinforced CMC article, comprising:
   one or more sections, each section comprising one or more generally planar laminate sheets wherein at least one of said sections has one or more out-of-plane features:
   one or more complementary sections comprising one or more generally planar laminate sheets wherein said complementary section has one or more macroscopic voids topographically matched to accept the one or more out-of-plane features of said sections; and
   wherein at least a portion of the one or more out-of-plane features protrude at least partially through the one or more generally planar laminate sheets forming the one or more complementary sections.

2. The CMC article of claim 1, wherein said out-of-plane feature comprises a loop and said void comprises an orifice.

3. The CMC article of claim 1, wherein said out-of-plane feature comprises a loop and said void comprises a matching loop.

4. The CMC article of claim 1, further comprising one or more means to secure the section to the complementary sections wherein the opposing faces of said section and said complementary section are held in contact.

5. The CMC article of claim 4, wherein said means to secure comprises a pin, a hook, or a clamp.

6. The CMC article of claim 1, wherein said out-of-plane feature comprises a flange and said void comprises a slot.

7. The CMC article of claim 6, wherein said flange contains a hole through which a means to secure can be inserted.

8. The CMC article of claim 1, wherein said out-of-plane feature comprises a flange with one or more grooves, said void comprises a slot wherein the translation of said slot into said groove secures said section to said complementary section.

9. The CMC article of claim 8, wherein two grooves are on opposite sides of said flange, said slot comprises two split portions of a pair of complementary sections, wherein translation of said two split portions of said slot into said two grooves secures said section to said complementary sections.

10. A method of construction of a ceramic matrix composite article comprising the steps of:
providing one or more sections, each section comprising one or more generally planar laminate sheets wherein at least one of said sections has one or more out-of-plane features;
providing one or more complementary sections comprising one or more generally planar laminate sheets wherein said complementary section has one or more macroscopic voids topographically matched to accept the one or more out-of-plane features of said sections, wherein at least a portion of the one or more out-of-plane features protrude at least partially through the one or more generally planar laminate sheets forming the one or more complementary sections;
inserting said out-of-plane features of said sections into said voids of said complementary sections, and
heating said section and said complementary section to cure the matrix.

11. The method of claim 10, further comprising the steps of:
providing one or more means to secure said sections to said complementary sections; and
inserting said means to secure through said out of plane feature wherein the opposing faces of said section and said complementary section are held in contact.

12. The method of claim 11, wherein said means to secure comprises a pin, a hook, or a clamp.

13. The method of claim 10, wherein said out-of-plane feature comprises a loop and said void comprises an orifice.

14. The method of claim 10, wherein said out-of-plane feature comprises a loop and said void comprises a matching loop.

15. The method of claim 10, wherein said out-of-plane feature comprises a flange and said void comprises a slot, and wherein said flange contains a hole through which a means to secure can be inserted.

16. The method of claim 10, wherein said out-of-plane feature comprises a flange with one or more grooves, said void comprises a slot wherein inserting of said slot into said groove secures said section to said complementary section and wherein two grooves are on opposite sides of said flange, said slot comprises two split portions of a pair of complementary sections, wherein inserting of said two split portions of said slot into said two grooves secures said section to said complementary section.

\* \* \* \* \*